Figure 1:
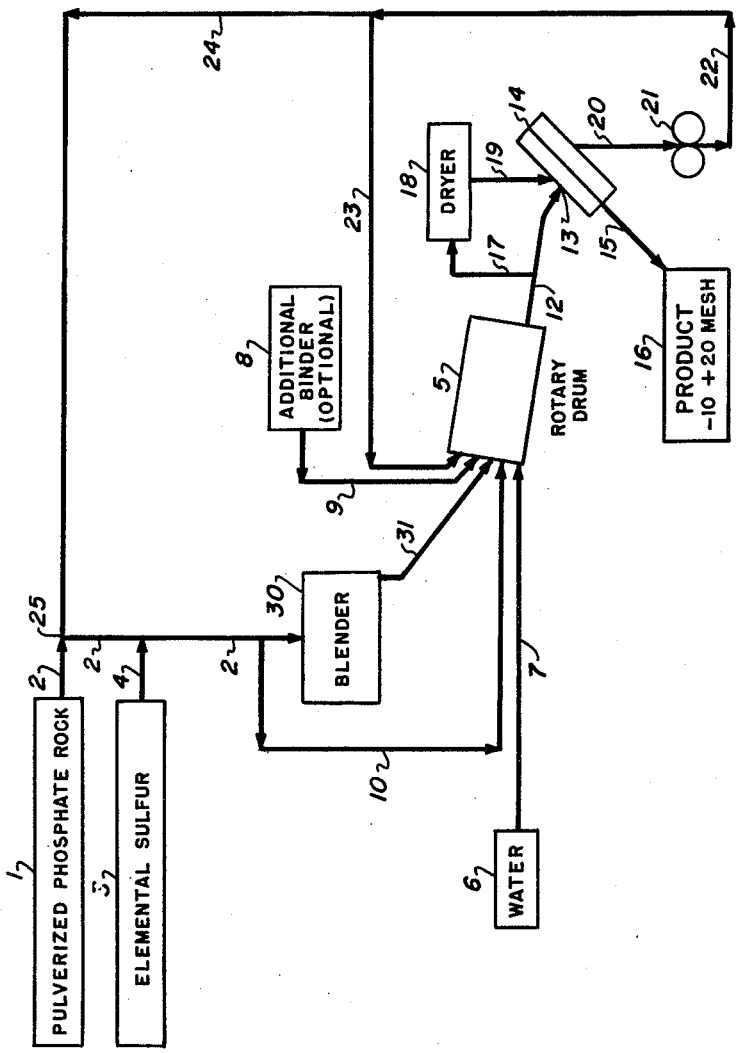

United States Patent Office 3,177,062
Patented Apr. 6, 1965

3,177,062
PROCESS OF MAKING A GRANULATED, HOMOGENEOUS PHOSPHATE ROCK SULFUR FERTILIZER
Travis P. Hignett, Sheffield, and George Hoffmeister, Jr., Florence, Ala., assignors to Tennessee Valley Authority, a corporation of the United States of America
Filed June 17, 1963, Ser. No. 288,565
1 Claim. (Cl. 71—33)
(Granted under Title 35, U.S. Code (1952), sec. 266)

The invention herein described may be manufactured and used by or for the Government for governmental purposes without the payment to us of any royalty therefor.

Our invention relates to a process of producing fertilizer compositions including as their major ingredients pulverized phosphate rock and elemental sulfur, and more particularly to a process for producing granular fertilizer product therefrom which product has a defined and critical particle size range thereby maximizing the relative effectiveness of said compositions as fertilizers.

Heretofore it has been recognized in the fertilizer industry that finely divided sulfur, when added to soil, is attacked and oxidized by certain microorganisms. Further, it has been recognized that when sulfur and raw rock phosphate are incorporated simultaneously in soil, products of oxidation of the sulfur (presumably acids) can act to render the phosphate more available to growing plants.

The chemical fertilizer industry has recognized the desirability of producing such a fertilizer composition from phosphate rock and sulfur in a form which effectively remains in an available state in the soil for an unusually long period of time, and allows the acids formed by the gradual oxidation of the sulfur to act freely with the surrounding phosphate without interference of soil bases, thereby effecting an efficient, simple, unusually cheap, and readily practiced process of making the fertilizer composition. In fact, work along these lines as much as 25 years ago is disclosed in U.S. Patent No. 2,097,446, Petersen et al., wherein he disclosed a process for making a phosphate sulfur fertilizer wherein provision is made for such a composition in pellet form which is sufficiently resistant to fracture wherein each pellet, which is preferably porous, constitutes a mass of phosphate particles bound together by fused sulfur distributed throughout the interior of the pellet. In Petersen's process he teaches that the phosphate rock particles are bound together by the sulfur and the resulting mixture is readily subdivided into particles by pelletizing while the sulfur is in a molten state.

In U.S. Patent No. 2,161,035, Gilbert, there is also a similar teaching of a method of making phosphate sulfur fertilizer wherein the phosphate fertilizer material is bound together by sulfur. Gilbert apparently improves on the process of Petersen et al. in that his process is characterized by an improvement of the bonding action of the sulfur, viz., by adjustment of the pH of the sulfur through acidulation of the molten sulfur prior to its mixing with the phosphate rock particles. As is described in these prior-art processes, the phosphate sulfur fertilizers produced thereby should be more economical to produce than the usual phosphate fertilizers such as superphosphates, and their production and use might be especially attractive in under-developed countries that lack facilities for production of fertilizer by more complicated methods, which methods necessitate the costly installation of a sulfuric acid production unit. In addition, the production and use of such fertilizers may also be especially attractive for use in this country in that they lend themselves to the production of a low-cost fertilizer utilizing phosphate rock of grades lower than that normally acceptable for the production of the more conventional phosphate fertilizers currently used by the industry.

In the past, however, phosphate sulfur fertilizers of the type described above have had some outstanding disadvantages in that the uptake of the $P_2O_5$ values by the crop plants and the resulting yield of crop growth have been so low as to otherwise outweigh the advantageous features of simplicity and economy. In addition, processes such as disclosed by Petersen et al. and Gilbert wherein the use of molten sulfur is employed have been found to be lacking somewhat in ease and application in the equipment required due to the difficulties in handling the required molten sulfur and also in insuring that the sulfur applied in this manner is entirely homogeneous with the phosphate rock particles. Such molten sulfur tends to form globules which do not insure the production of the required homogeneous fertilizer pellets or granules and therefore the most efficient utilization of the oxidation of sulfur for formation of the required acids to act on the individual rock particles in the pellets or granules.

Our invention is directed to a method of producing a phosphate rock-sulfur fertilizer wherein the disadvantageous necessity of mixing the phosphate rock with sulfur in the molten state as shown in the discussion of Petersen et al. and Gilbert is eliminated and the above-mentioned disadvantageous low uptake of $P_2O_5$ values with a resulting low crop yield is overcome.

We have overcome the difficulties inherent in the processes of the type of the prior art to a substantial extent in the present invention by a process of blending together a mixture of pulverized phosphate rock and elemental sulfur, subsequently granulating same, and recovering granular product of a critical particle size range, which particle size range has been found to maximize substantially the uptake of the realizable $P_2O_5$ values by the plant and insure a maximum yield of the crop. In addition, the fertilizer produced by our process has been found to be available to the plant over a longer period of time than are the currently used commercial fertilizers thereby in effect producing a fertilizer having a controlled rate of dissolution in the soil. Therefore, our method of preparing phosphate rock-sulfur mixtures for use as fertilizers represents a real improvement over the methods suggested by previous investigators and differs from such previous methods in at least the following three important respects.

(1) We find it beneficial to form mixtures of finely divided (—100 mesh) rock and sulfur into granules or agglomerates prior to application to the soil. A binder such as clay can be used. The beneficial effects of such granulation are realized probably because the rock and sulfur remain in closer proximity in the soil than when the mixture is applied without granulation. Thus, the sulfur oxidation products are more efficiently utilized in the granules. Also, the reduced contact of the phosphate with the soil probably reduces phosphate fixation.

(2) We find it beneficial to adjust the size of the rock-sulfur granules to an optimum value. Granules of —10-plus 20-mesh size were more efficient than were either larger (−6 +10) or smaller (−35) ones. The indications of laboratory work are that oxidation of sulfur in the larger granules was too slow to provide the growing plants with phosphorus at an optimum rate. Oxidation was rapid with the minus 35-mesh material, but either the reaction with phosphate was inefficient or fixation of phosphate by soil was excessive.

(3) We find it beneficial to incorporate some soil in the phosphate-sulfur granules and to heat the granules to about 290° F. For example, incorporation of 30 parts of soil per 100 parts of phosphate followed by heat treatment was beneficial. The reasons for this benefit are uncertain, but they may be related to changes in porosity of the granules.

In our improved process of preparing homogeneous granules within the critical size range with the sulfur disseminated throughout the interior of the granule several new and advantageous features over the conventional processes for the production of phosphate rock-sulfur fertilizers are realized. Among these advantageous features are: (1) The acids will be formed by microbiological activity in the soil at sites surrounded by phosphate rock, thereby maximizing the probability that the acid will react with the phosphate rock rather than with the soil minerals. (2) The phosphorus will be solubilized gradually, thereby minimizing fixation of phosphorus by the soil which is a problem with soluble phosphate fertilizers. The rate at which the phosphorus is solubilized and thus made available to plants may be controlled by control of the granule size and granule porosity. (3) Granular fertilizers are preferred by farmers because they are free flowing, easily spread, and not dusty.

As compared with common phosphate fertilizers, such as superphosphate, our invention offers the following advantages: It is cheaper. As compared with superphosphate the same amounts of sulfur and phosphate rock are required but the step of converting sulfur to sulfuric acid is omitted. Our process is simpler in that no chemical reactions are involved in manufacturing, no curing is necessary, and the product may be more concentrated than normal superphosphate in that the product made according to our invention in a number of formulations contained 25 to 26 percent $P_2O_5$ as compared with about 20 percent $P_2O_5$ for normal superphosphate. Since the phosphorus in the product of our invention becomes soluble gradually in the soil it is less likely to be "fixed" by the soil before it can be used by crops. In addition, the product of our invention is not corrosive to farm machinery, is nonhygroscopic, has no tendency to become sticky or cake, and furthermore, low-grade rock not normally suitable for superphosphate manufacture may be utilized therein.

Thus, the fertilizer material produced by our process is relatively cheap and simple to make, is of a nature such that the potential plant nutrient values are most efficiently utilized, and has a controlled rate of dissolution in the soil. Such fertilizer materials having controlled rates of dissolution have numerous advantages over conventional fertilizers in that such materials greatly reduce the leaching of the fertilizer by movement of the soil solution, minimize luxury consumption of the fertilizer by the plant, lower toxicity to seedlings or plants due to salt concentration, and decrease the loss of fertilizer values due to decomposition of same to the gaseous phase. On the other hand, conventional fertilizer materials not having such a controlled rate of dissolution when applied to the soil have much of their nutrient values carried away by the natural or artificial ground drainage and so are wasted as far as useful contribution to the growth of the crop for which they are supplied. In fact, experiments have shown that as much as 80 percent of the fertilizer may be so wasted. Therefore, smaller quantities of fertilizers having controlled dissolution rates can give the same effects as a larger quantity of hygroscopic fertilizer material, or the same quantity of fertilizer having a controlled dissolution rate can give a more prolonged effect throughout the growing season.

It is therefore an object of the present invention to provide a process for the production of a phosphate rock-sulfur fertilizer in a form which effectively remains in an available state in the soil for an unusually long period of time and allows the acids formed by gradual oxidation of the sulfur to act freely with the surrounding phosphate without interference of soil bases; which process is efficient, simple, unusually cheap, and readily practiced.

A further object of the present invention is to provide a process for the production of a phosphate rock-sulfur fertilizer in a form which effectively remains in an available state in the soil for an unusually long period of time and allows the acids formed by gradual oxidation of the sulfur to act freely with the surrounding phosphate without interference of soil bases, which process is efficient, simple, unusually cheap, and readily practiced, and which process is characterized by the fact that the fertilizer granules produced therefrom are within a critical size range which range maximizes the uptake and availability to the plant of the $P_2O_5$ values therein.

A still further object of the present invention is to provide an efficient and simple process whereby sulfur is mixed with phosphate rock particles to bind them together in granular form wherein each pellet constitutes a mass of phosphate particles bound together with sulfur distributed homogeneously throughout the interior of the pellet, and the resulting mixture is subsequently sized within a desired critical range.

Still further and more general objects and advantages of the present invention will appear from the more detailed description set forth below, it being understood, however, that this more detailed description is given by way of illustration and explanation only and not by way of limitation since various changes therein may be made by those skilled in the art without departing from the spirit and scope of the present invention.

In carrying out the objects of our invention in one form thereof, we employ a process which comprises dry blending pulverized phosphate rock, elemental sulfur, and a binding agent such as clay, subsequently granulating the blended mixture, subsequently sizing the granulated mixture, and withdrawing as product that portion of material having a size range of minus 10-plus-20-mesh. In our process the phosphate rock and sulfur mixture may be blended and subsequently granulated by introduction into a rotating drum or alternatively the pulverized rock and sulfur may be added to a rotating drum for blending and subsequent granulation therein through the addition of an aqueous medium such as water. The granular material removed from the rotating drum may be dried prior to screening and the portions of material which are not onsize may be sent to a crushing operation and then returned to join with the source of pulverized phosphate rock.

Our invention, together with further objects and advantages thereof, will be better understood from a consideration of the following description taken in connection with the accompanying drawing in which:

FIGURE 1 is a flowsheet generally illustrating the principles of our process which results in solid fertilizer products having the novel properties mentioned above.

Referring now more particularly to FIGURE 1, pulverized phosphate rock from source 1 may be introduced by means of line 2 into blender 30, along with elemental sulfur from source 3 joining line 2 via means of line 4. The material is mixed and blended in blender 30, withdrawn and introduced by line 31 into rotary drum 5. An aqueous medium shown for sake of convenience as water from source 6 may be fed via line 7 into rotary drum 5 to aid in granulation. Granulation is facilitated by adding a small amount of water in the blender to moisten the mixture. Alternatively, a rotary pan-type granulator may be utilized in place of rotary drum 5.

When desired, additional binder material such as clay or fine soil from source 8 may be fed via line 9 into rotary drum 5. In the instance wherein blender 30 is not incorporated and it is desired to dry blend the mixture of rock and sulfur in rotary drum 5, the material may be fed via lines 2 and 10 directly into rotary drum 5, dry blended, and after sufficient mixing action has taken place, the aqueous medium from source 6 in line 7 may be introduced into rotary drum 5. After the desired granulation has taken place in rotary drum 5, the material may be withdrawn via lines 12 and 13 and fed to screening means generally shown as 14 and the onsize product withdrawn from said screening means 14 via line 15 to storage bin 16. Alternatively, if the material is to be dried prior to screening, it may be withdrawn from rotary drum 5 via lines 12 and 17 to dryer 18 and subsequently introduced to sizing means 14 via line 19. To even more greatly promote the economics of our process, the offsize material from screen means 14 may be introduced via line 20 to a crushing means generally shown at 21 and subsequently returned to join at junction 25 with phosphate rock source via means of lines 22 and 24, or alternatively, such crushed material may be fed directly back into rotary drum 5 via lines 22 and 23.

In order that those skilled in the art may better understand how the present invention can be practiced, the following examples of processes which we have used in producing our phosphate rock-sulfur fertilizer granules having the desired advantages and characteristics enumerated supra, thereby insuring a fertilizer product having a controlled rate of dissolution in the soil solution and a maximum availability of plant nutrient values to the corp, are given by way of illustration and not by way of limitation. In studying these examples, particular emphasis should be directed to the outstanding characteristics of the onsize material, viz. minus 10- plus 20-mesh granules, as compared to the offsize granules which, for convenience, are generally enumerated infra as course materials minus 6- plus 10-mesh and fine materials minus 35-mesh granules.

EXAMPLE I

A number of granular and nongranular products containing pulverized phosphate rock and flowers of sulfur were prepared for greenhouse testing. Each of these was used in preparing granular products of minus 6- plus 10-mesh, and minus 10- plus 20-mesh sizes and nongranular products of minus 35-mesh size. Products of each size were prepared in both an "unstabilized" and a "heat-stabilized" form, as will be explained.

In the first two formulations (I and IIA), the proportion of sulfur used was 20 parts per 100 parts of phosphate, which is 90 to 100 percent as much as is required in production of ordinary superphosphate. In the third formulation (VA), the amount of sulfur was about 50 percent of that required for superphosphate. Ball clay was included in all formulations as a binder. Topsoil (Webster silt clay loam) was included in all except Formulation I because it was believed that it might provide a favorable environment for bacteria involved in the sulfur oxidation. It was found that a larger proportion (20% v. 10%) of clay was required to bind the mixtures that contained soil. However, this probably would not be true with a more clayey-type soil.

Chemical analyses and other information on the finished products resulting from this series of tests are given in Table I below.

Table I.—Granular and nongranular phosphate rock-sulfur mixtures prepared for greenhouse tests FORMULATION I (100 PARTS PHOSPHATE ROCK,[a] 20 PARTS SULFUR,[b] 10 PARTS BALL CLAY

| Sample No. | Heat stabilized? | Particle size, mesh | Chemical analyses | | | | $S:P_2O_5$, wt. ratio | Lb./100 lb. rock |
|---|---|---|---|---|---|---|---|---|
| | | | Lab. No. | Total wt., percent | | | | |
| | | | | $P_2O_5$ | S | N | | |
| I-U-C | No | −6+10 | 91,859 | 25.8 | 16.0 | 0 | 0.620 | 21 |
| I-H-C | Yes | −6+10 | 91,862 | 25.6 | 15.6 | 0 | 0.609 | 20 |
| I-U-M | No | −10+20 | 91,860 | 25.0 | 16.0 | 0 | 0.640 | 21 |
| I-H-M | Yes | −10+20 | 91,863 | 25.8 | 15.4 | 0 | 0.596 | 20 |
| I-U-F | No | −35 | 91,861 | 25.7 | 15.3 | 0 | 0.595 | 20 |
| I-H-F | Yes | c −35 | 91,864 | 25.5 | 16.2 | 0 | 0.642 | 21 |

FORMULATION IIA (100 PARTS PHOSPHATE ROCK,[a] 20 PARTS SULFUR,[b] 30 PARTS SOIL,[d] 20 PARTS BALL CLAY)

| Sample No. | Heat stabilized? | Particle size, mesh | Lab. No. | $P_2O_5$ | S | N | $S:P_2O_5$, wt. ratio | Lb./100 lb. rock |
|---|---|---|---|---|---|---|---|---|
| IIA-U-C | No | −6+10 | 91,865 | 19.6 | 12.2 | 0 | 0.622 | 21 |
| IIA-H-C | Yes | −6+10 | 91,871 | 20.0 | 11.5 | 0 | 0.575 | 19 |
| IIA-U-M | No | −10+20 | 91,866 | 19.4 | 12.1 | 0 | 0.623 | 21 |
| IIA-H-M | Yes | −10+20 | 91,872 | 20.0 | 12.1 | 0 | 0.605 | 20 |
| IIA-U-CF | No | c −35 | 91,865 | 19.6 | 12.2 | 0 | 0.622 | 21 |
| IIA-H-F | Yes | c −35 | 91,873 | 19.8 | 13.2 | 0 | 0.666 | 22 |

FORMULATION VA (100 PARTS PHOSPHATE ROCK,[a] 11 PARTS SULFUR,[b] 30 PARTS SOIL,[d] 20 PARTS BALL CLAY)

| Sample No. | Heat stabilized? | Particle size, mesh | Lab. No. | $P_2O_5$ | S | N | $S:P_2O_5$, wt. ratio | Lb./100 lb. rock |
|---|---|---|---|---|---|---|---|---|
| VA-U-C | No | −6+10 | 91,903 | 20.6 | 7.4 | 0 | 0.359 | 12 |
| VA-H-C | Yes | −6+10 | 91,906 | 20.9 | 7.3 | 0 | 0.349 | 12 |
| VA-U-M | No | −10+20 | 91,904 | 20.6 | 7.2 | 0 | 0.350 | 12 |
| VA-H-M | Yes | −10+20 | 91,907 | 20.7 | 6.9 | 0 | 0.333 | 11 |
| VA-U-F | No | −35 | 91,905 | 21.7 | 7.7 | 0 | 0.355 | 12 |
| VA-H-F | Yes | c −35 | 91,908 | 20.7 | 7.1 | 0 | 0.343 | 11 |

[a] Florida CSP dust: $P_2O_5$, 33.3%; CaO: $P_2O_5$ weight ratio, 1.50. Particle size: 81%−100 mesh, 70%−200 mesh.
[b] Extremely fine sublimate.
[c] Prepared by crushing −6+10-mesh granular material.
[d] Webster silt clay loam (Iowa).

*Unstabilized products.*—The dry ingredients (except ammonium sulfate) of each formulation were first mixed thoroughly. The mixture was then granulated in a small rotary granulator by addition of water. The granulator product was dried overnight at about 200° F. and was screened to give size fractions of minus 6 plus 10, minus 10 plus 20, and minus 35 mesh. Portions of these size fractions were reserved as unstabilized products for greenhouse testing. Chemical analyses later showed that either segregation or volatilization during drying had seriously affected the composition of the minus 35-mesh fractions of Formulation IIA. Therefore, portions of the minus 6- plus 10-mesh dried granules were crushed to provide the minus 35-mesh fractions of this formulation.

*Heat-stabilized granules.*—The melting point of sulfur is 248° F. Therefore, in the granules prepared as described above with only moderate drying temperature, the sulfur did not fuse and was bound to other ingredients of the mix only by action of the clay binder. Such unstabilized granules disintegrate when they become wet. It is likely that in the soil such disintegration would occur, and that intimate sulfur-phosphate contact would be destroyed. To stabilize granules against such disintegration, portions of the minus 6- plus 10- and minus 10- plus 20-mesh granules prepared as described above were heated for 2 hours in 500-ml. Erlenmeyer flasks in an oven at 300° F. In this time, granules in the flasks reached 290° F., which was well above the melting point of the sulfur. After cooling, the granules did not disintegrate in water, which indicates that the sulfur had fused, and, on solidification, had bonded the ingredients of the granule. Portions of the heat-stabilized minus 6- plus 10-mesh granules were crushed to provide the heat-stabilized minus 35-mesh materials.

In the patent by Gilbert, supra, it is claimed that small additions of ammonium sulfate, sulfuric acid, or any of several other acidic materials increase the ability of molten sulfur to wet phosphate rock. In our studies along these lines, granules containing ammonium sulfate were not noticeably stronger than the others after heat treatment.

*Chemical analyses.*—Portions of the materials prepared for greenhouse tests were analyzed for $P_2O_5$ and sulfur contents to determine any losses or errors that might have occurred during processing. The results showed that in all but two cases actual compositions were reasonably close to formulated values.

EXAMPLE II.—GREENHOUSE TESTS

In these tests the experimental products were mixed with the soil just prior to planting. The Table II shows the relative dry weights of the first crop of corn plants (2 months old) grown with the experimental products applied at the rate of 60 pounds of $P_2O_5$ per acre. A parallel test at a 120-pound rate gave dry weights that were about 50 percent greater but which were in the same relative proportions. Phosphorus uptakes, as measured by analyses of the harvested plants, also were in essentially the same relative proportions as the dry weights.

The product that gave the best response in the greenhouse tests was 60 percent as effective as superphosphate applied at the same rate and was essentially as effective as dicalcium phosphate which is widely recognized as an effective fertilizer for long-term use. This product (Formulation IIA) was of intermediate size (−10 +20 mesh), contained 20 parts of sulfur, 20 parts of clay, and 30 parts of soil per 100 parts of rock, and had been heat treated as described above. Product of this particle size was about 50 percent more effective than either the larger (−6 +10 mesh) or finer (35 mesh) material of the same composition. Omission of either heating or incorporation of soil reduced effectiveness to 50 percent of that of superphosphate. Reduction of sulfur content to 11 parts per 100 parts of rock reduced effectiveness to 40 percent. Heating was not beneficial at the lower sulfur level or when soil was omitted at the higher level.

Incorporation of rock and sulfur separately in the soil was less effective than use of any of the granulated materials, including the minus 35-mesh material, and was no more effective than application of rock alone. These results indicate that the sulfur-phosphate reaction is favored by granulation, possibly as a result of decreased contact with the soil. With particle sizes above about minus 10 plus 20 mesh, however, this benefit appears to be offset by decreased agronomic effectiveness of the larger granules. The results of these tests are shown in Table II below.

*Table II.—Growth of corn in greenhouse tests of phosphate rock-sulfur fertilizers[a]*

FORMULATION IIA—100 PARTS ROCK, 20 PARTS SULFUR, 30 PARTS SOIL, 20 PARTS CLAY

[Fertilizer applied at seeding time]

| Treatment | Relative dry weight[b] of plants when using fertilizer of indicated particle size (dry weight with superphosphate=100) | | |
|---|---|---|---|
| | −6+10 mesh | −10+20 mesh | −35 mesh |
| Unheated | 39 | 50 | 33 |
| Heated | 42 | 60 | 38 |

FORMULATION I—100 PARTS ROCK, 20 PARTS SULFUR, 10 PARTS CLAY

| Treatment | −6+10 mesh | −10+20 mesh | −35 mesh |
|---|---|---|---|
| Unheated | | 50 | |
| Heated | | 50 | |

FORMULATION VA—100 PARTS ROCK, 11 PARTS SULFUR, 30 PARTS SOIL, 20 PARTS CLAY

| Treatment | −6+10 mesh | −10+20 mesh | −35 mesh |
|---|---|---|---|
| Unheated | 34 | 40 | 31 |
| Heated | 36 | 40 | 33 |

ROCK-CLAY MIX—100 PARTS ROCK, 10 PARTS CLAY

| Treatment | −6+10 mesh | −10+20 mesh | −35 mesh |
|---|---|---|---|
| Unheated | 20 | 20 | 28 |
| Same except 20 parts sulfur incorporated in soil with fertilizer | 21 | 22 | 25 |
| No phosphate | | (18) | |
| Dicalcium Phosphate—20 parts sulfur incorporated in soil with fertilizer | 29 | 38 | 61 |
| Triple Superphosphate—20 parts sulfur incorporated in soil with fertilizer | | | 100 |

[a] Soil was unlimed Hartsell's fine sandy loam (pH, 5.2). Fertilizers were applied at rate of 60 pounds of $P_2O_5$ per acre.
[b] Yield with triple superphosphate applied at seeding time taken to be 100 percent.

EXAMPLE III

In this series of tests the analyses of the fertilizers prepared were generally similar to those shown in Table I of Example I above. In this series of tests pulverized phosphate rock alone and phosphate rock, dicalcium phosphate, and concentrated superphosphate (CSP) were also included with S being added at the time of incorporation with the soil in amounts to supply 127 and 254 mg. per culture. The yields of dry matter uptake of phosphorus by the first crop of corn are as shown in Table III following.

*Table III.—Yield of dry matter and uptake of P by corn, as affected by addition of S and granule size with Hartsells fine sandy loam*

100 PARTS R, 20 PARTS S, 30 PARTS SOIL, AND 20 PARTS CLAY

| Fertilizer No.[1] | Yield of dry matter, G. per pot | | Uptake of P, Mg. per pot | |
|---|---|---|---|---|
| | 90 mg. | 180 mg. | 90 mg. | 180 mg. |
| II-U-C | 6.8 | 8.7 | 6.7 | 9.7 |
| H-C | 7.4 | 10.1 | 7.8 | 10.8 |
| U-M | 8.7 | 11.8 | 9.7 | 12.9 |
| H-M | 10.4 | 15.6 | 11.2 | 18.2 |
| U-F | 5.7 | 7.0 | 5.5 | 7.3 |
| H-F | 6.6 | 10.0 | 6.9 | 10.8 |

100 PARTS R, 11 PARTS S, 30 PARTS SOIL, AND 20 PARTS CLAY

| | | | | |
|---|---|---|---|---|
| V-U-C | 5.9 | 8.5 | 6.4 | 9.5 |
| H-C | 6.2 | 8.2 | 6.1 | 8.4 |
| U-M | 7.0 | 11.0 | 7.2 | 14.1 |
| H-M | 7.0 | 9.2 | 7.1 | 9.5 |
| U-F | 5.4 | 7.7 | 5.7 | 8.8 |
| H-F | 5.8 | 7.5 | 5.9 | 8.8 |

100 PARTS R, 20 PARTS S, AND 10 PARTS CLAY

| | | | | |
|---|---|---|---|---|
| I-U-M | 8.7 | 13.7 | 9.5 | 15.7 |
| H-M | 8.8 | 12.5 | 9.3 | 15.0 |

100 PARTS R AND 10 PARTS CLAY, ALONE AND PLUS 20 PARTS S

| | | | | |
|---|---|---|---|---|
| R-C | 3.5 | 3.6 | 3.3 | 3.3 |
| R-M | 3.4 | 3.9 | 3.1 | 3.8 |
| R-F | 4.8 | 6.9 | 4.9 | 7.4 |
| R-C+S | 3.6 | 4.2 | 3.4 | 4.5 |
| R-M+S | 3.8 | 5.1 | 3.6 | 5.3 |
| R-F+S | 4.4 | 5.7 | 4.6 | 5.8 |

DICALCIUM PHOSPHATE AND CONCENTRATED SUPERPHOSPHATE (+S)

| | | | | |
|---|---|---|---|---|
| DCPA-C+S | 5.0 | 7.4 | 5.4 | 7.5 |
| M+S | 6.7 | 9.9 | 7.8 | 10.7 |
| F+S | 10.7 | 23.9 | 12.2 | 28.6 |
| CSP-M+S | 17.4 | 28.7 | 18.4 | 29.7 |
| No P+S | 3.1 | 2.8 | 2.7 | |

[1] U, Granules not heat stabilized; H, granules heat stabilized; C, −6+10 M, −10+20 mesh; F, −35 mesh granules; R, phosphate rock; S, sulfur; DCPA, anhydrous dicalcium phosphate; and CSP, concentrated superphosphate.

It was found in these tests that the uptake of phosphorus by corn was essentially linear with the 0-, 90-, and 180-milligram rates of application.

While we have shown and described particular embodiments of our invention, modifications and variations thereof will occur to those skilled in the art. We wish it to be understood therefore that the appended claim is intended to cover such modifications and variations which are within the true scope and spirit of our invention.

What we claim as new and desire to secure by Letters Patent of the United States is:

The process of making a granulated, homogeneous phosphate rock-sulfur fertilizer of minus 10- plus 20-mesh, which process consists essentially of the steps of pulverizing raw phosphate rock, mixing and blending said pulverized phosphate rock with particulate elemental sulfur in proportions such that approximately 10 to 30 parts of sulfur are utilized per 100 parts of phosphate rock, subsequently granulating the mixed and blended phosphate rock and elemental sulfur, subsequently subjecting said granulated phosphate rock and elemental sulfur to a sizing step; returning the undersize and crushed oversize portions thereof from said sizing step to the aforementioned mixing and blending step; withdrawing from said sizing step only those homogeneous granules which fall within the size range of minus 10- plus 20-mesh of an intimate mixture of ground phosphate rock and elemental sulfur; subsequently stabilizing said withdrawn granules which fall within said size range by heating same to a temperature of about 300° F. for a period of approximately 1 to 2 hours; and recovering said stabilized granules as product.

References Cited by the Examiner

UNITED STATES PATENTS

| 1,222,112 | 4/17 | Lippman | 71—33 |
| 2,097,446 | 11/37 | Claiborne et al. | 71—33 |
| 3,100,698 | 8/63 | Horsley et al. | 71—64 |

DONALL H. SYLVESTER, *Primary Examiner.*

ANTHONY SCIAMANNA, *Examiner.*